(No Model.)

W. McQUISTON.
NUT LOCK.

No. 427,479. Patented May 6, 1890.

WITNESSES:
F. L. Durand.
Wm. F. Freks.

INVENTOR:
William McQuiston
by James Dagger & Co.
Attorneys

UNITED STATES PATENT OFFICE.

WILLIAM McQUISTON, OF WILKINSBURG, PENNSYLVANIA.

NUT-LOCK.

SPECIFICATION forming part of Letters Patent No. 427,479, dated May 6, 1890.

Application filed September 14, 1889. Serial No. 323,914. (No model.)

*To all whom it may concern:*

Be it known that I, WILLIAM McQUISTON, a citizen of the United States, and a resident of Wilkinsburg, in the county of Allegheny and State of Pennsylvania, have invented certain new and useful Improvements in Nut-Locks; and I do hereby declare that the following is a full, clear, and exact description of the invention, which will enable others skilled in the art to which it appertains to make and use the same.

My invention relates to improvements in nut-locks; and the object of the invention is the production of a simple, durable, and inexpensive device, which will securely retain the nuts on bolts and withstand the hard usage to which they are subjected.

The invention consists of the novel nut-lock illustrated, described, and claimed herein.

Figure 1:
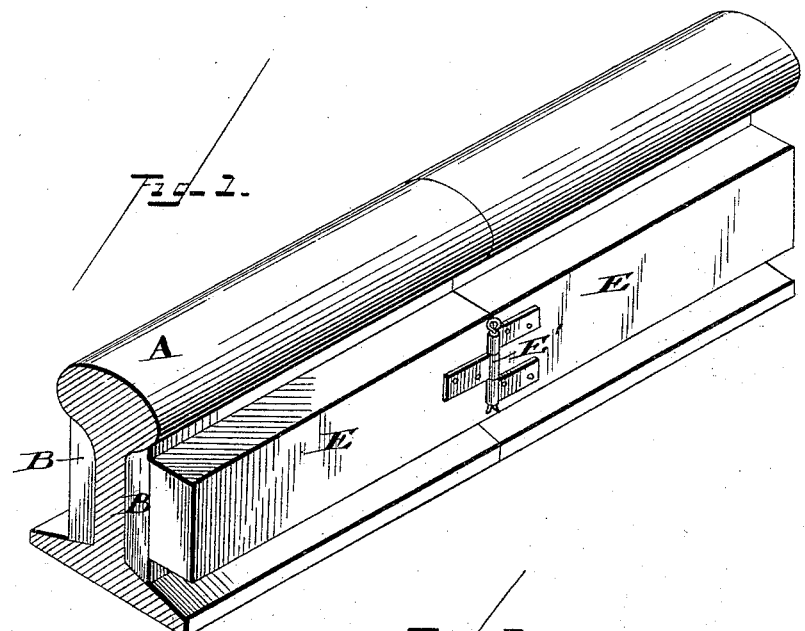
Figure 2:
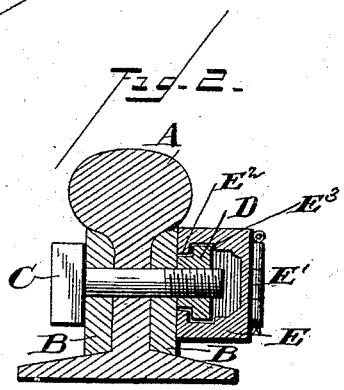
Figure 3:
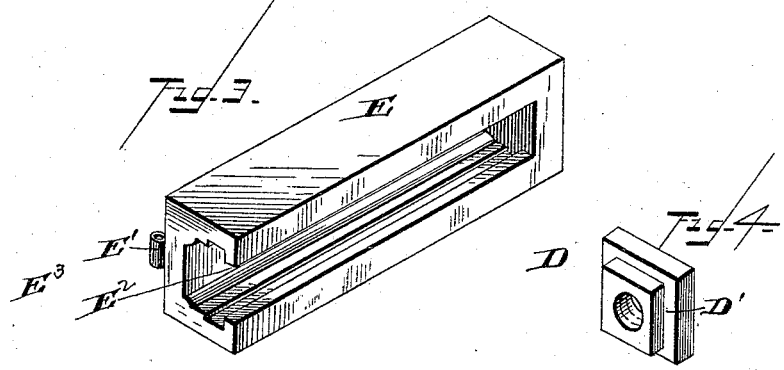
Figure 4:
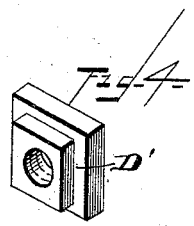

Figure 1 is a perspective of my invention. Fig. 2 is a transverse section of the same. Fig. 3 is a perspective of part of the locking-bar, and Fig. 4 is a perspective of the nuts.

Referring to the drawings by letter, A designates a railroad-rail, B the fish-plates on opposite sides thereof, and C the bolts passing through said fish-plates and rails.

D designates the nuts which engage the bolts, and said nuts are formed with the inner reduced portion D'.

E designates the locking-bar, which in this instance is formed in two parts secured together by the fastening E'. The locking-bar is formed with the channel or groove $E^2$ to receive the reduced portion D' of the nut, and the channel or groove $E^3$ to receive the enlarged portions D of the nuts and has the ends closed to prevent the entrance of dirt or the like.

The operation of the device will be readily understood. The nuts are screwed on the bolts, and when in line the locking-bar is slid over them, the channels or grooves therein making a dovetailed connection with the nuts and securely retaining them in place.

It is evident that I produce a nut-lock which will securely retain the nuts in place, which will protect the nuts from the damaging influence of the weather, which can be easily applied and detached, and which is simple and cheap.

Having thus described my invention, I claim and desire to secure by Letters Patent of the United States—

The combination, with a bolt and a nut, consisting of the enlarged portion D and reduced portion D', of the two locking-bars E and their connections E', each of said bars being provided with the grooves or channels $E^2$ and $E^3$, with which the portions D' and D, respectively, engage when the bar is slid over the nut, whereby the latter is prevented from turning, substantially as described.

In testimony that I claim the foregoing as my own I have hereunto affixed my signature in presence of two witnesses.

WILLIAM McQUISTON.

Witnesses:
  FRANK CONRAD,
  WILLIAM J. LYNN.